Feb. 14, 1928.
E. E. TOWLE
1,659,009
GRAIN DRILL
Filed June 19, 1922
3 Sheets-Sheet 2
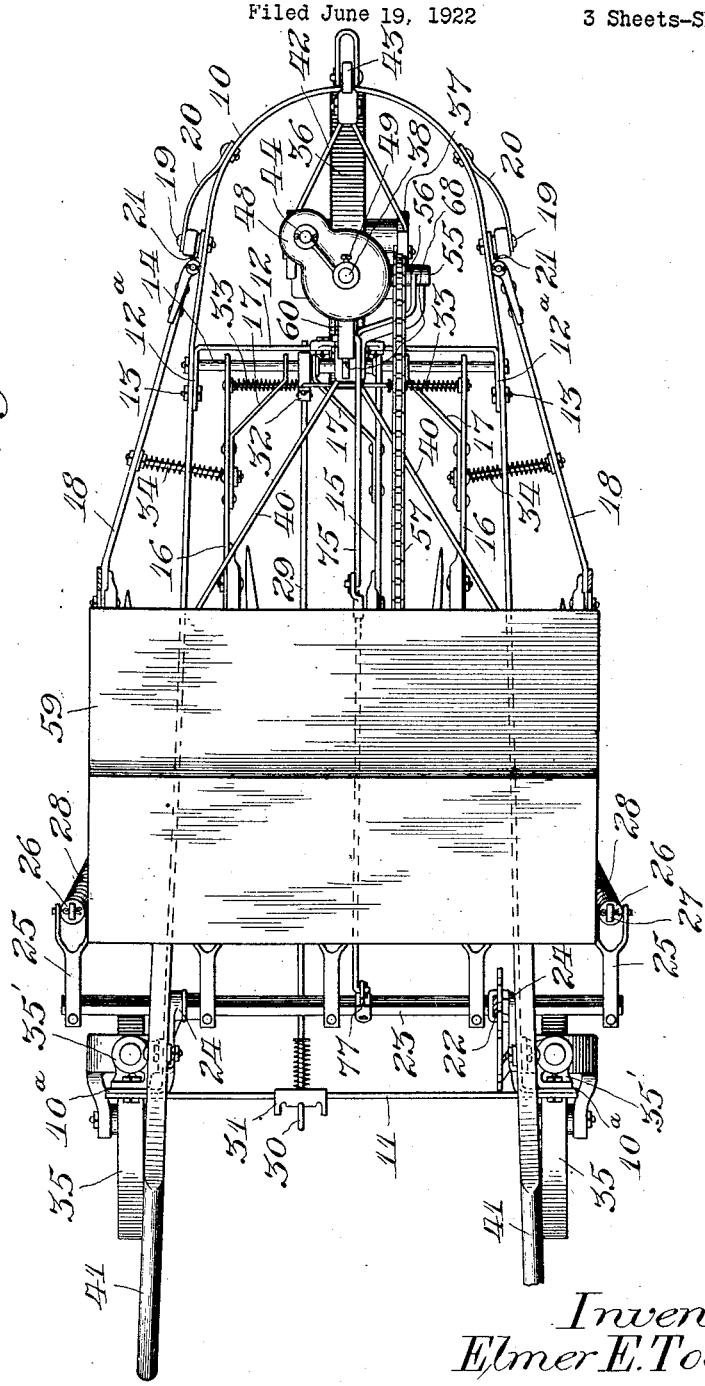
Inventor.
Elmer E. Towle,
By H.P. Doolittle
Atty.

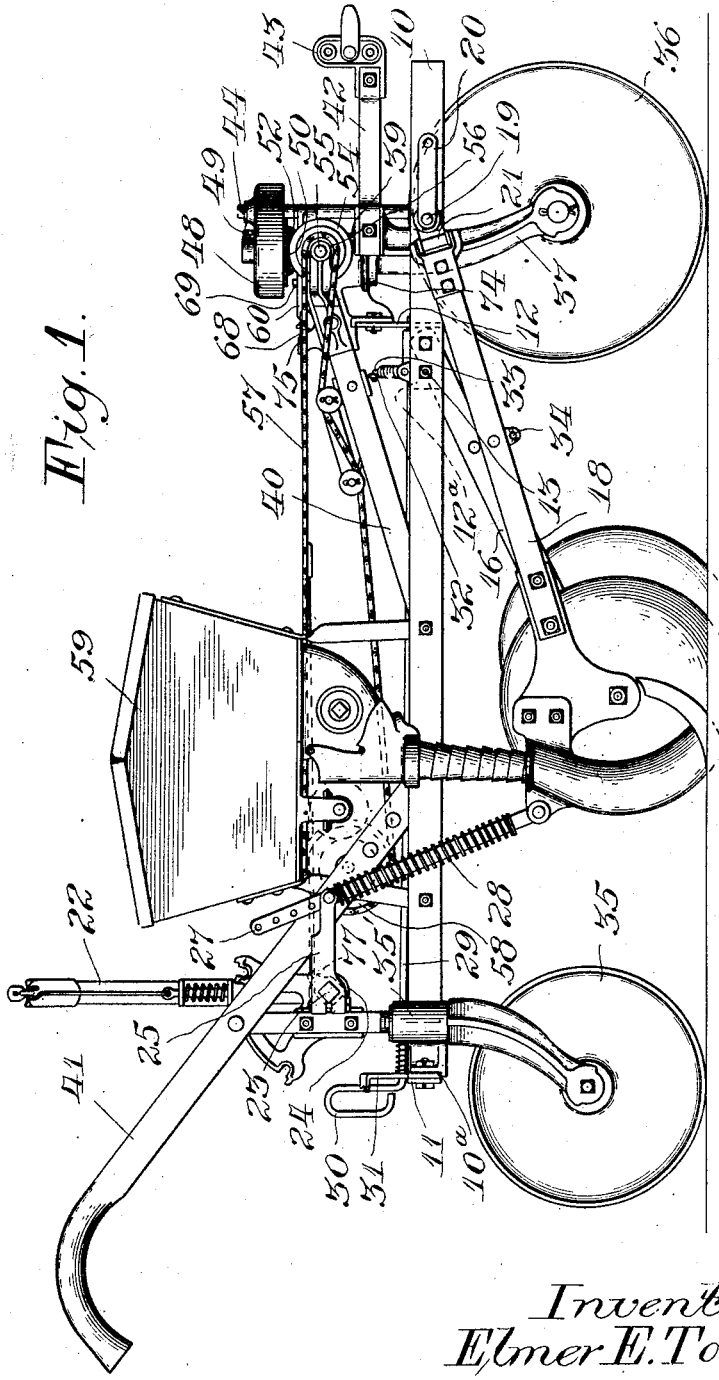

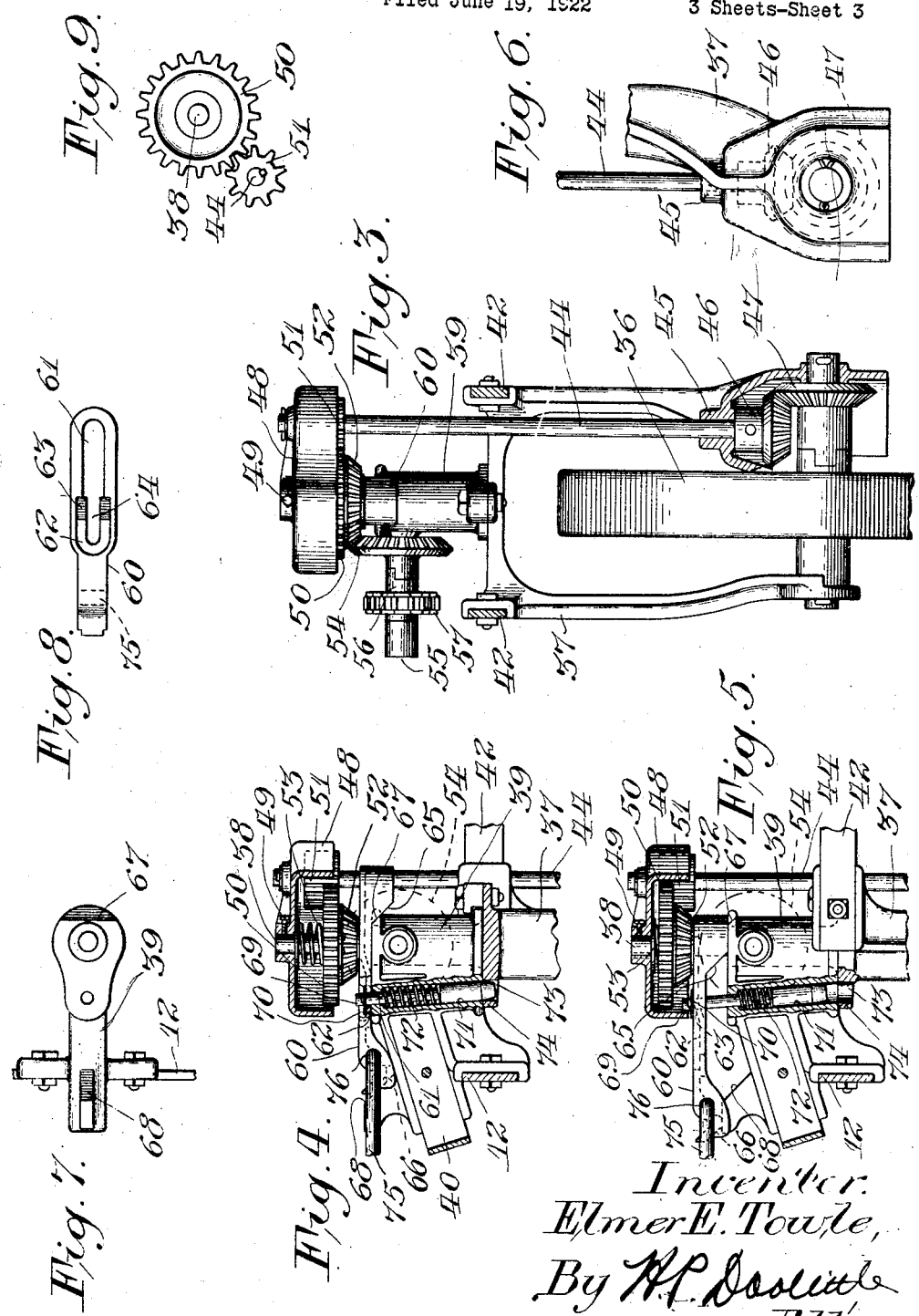
Feb. 14, 1928.
E. E. TOWLE
1,659,009
GRAIN DRILL
Filed June 19, 1922
3 Sheets-Sheet 3
Inventor:
Elmer E. Towle,
By H. C. Doolittle
Atty.

Patented Feb. 14, 1928.

UNITED STATES PATENT OFFICE.

ELMER E. TOWLE, OF RICHMOND, INDIANA, ASSIGNOR TO INTERNATIONAL HARVESTER COMPANY, OF CHICAGO, ILLINOIS, A CORPORATION OF NEW JERSEY.

GRAIN DRILL.

Application filed June 19, 1922. Serial No. 569,326.

The present invention relates to grain drills of the hand guided or walking type and is directed more particularly to improvement in the construction and arrangement of the drive for the seeding mechanism and of the means for guiding and turning the machine.

With this in view, a walking drill of improved construction has been devised which is supported on one front and two rear wheels all of which can caster or swivel during a turn, the drive for the seeding mechanism being from the front wheel and the construction being such that operation of the driving mechanism and swiveling of the front drive wheel are both automatically controlled by the raising and lowering mechanism for the furrow openers, the arrangement of the driving mechanism being such as not to interfere with swiveling of the front wheel.

The invention accordingly comprises the organization and details of construction, or their equivalents, hereinafter described and claimed and illustrated in the accompanying drawings where—

Fig. 1 is a side view of a drill embodying the invention;

Fig. 2 is a plan view thereof;

Fig. 3 is an enlarged front view of the front or drive wheel and associated drive mechanism;

Fig. 4 is a detail side view of the upper part of Fig. 3 showing the drive gears in meshing position;

Fig. 5 is a similar view with the drive gears out of meshing position;

Fig. 6 is a detail side view of the lower part of Fig. 3;

Fig. 7 is a detail top view of the casting or head block supporting the front wheel;

Fig. 8 is a top detail view of the slide member for controlling the drive and front wheel; and Fig. 9 is a detail view of the upper drive gears.

The planter comprises a main frame, preferably formed of a curved or U-shaped bar 10, the limbs or branches of which are directed rearwardly and then bent outwardly at their ends as at 10ª. The rear cross bar 11 is secured to the bent ends 10ª and a front cross bar 12 connects the sides of the frame at the base of the arched part of bar 10. The cross bar 12 is preferably formed with angularly bent ends 12ª which are secured to bar 10 by fastening elements 13 and by a cylindrical rod 14 which extends across the frame parallel with bar 12 and has its ends passed through and secured to the bent ends 12ª and the frame bar 10 in the manner shown in Fig. 1. The rod 14 serves as a bearing or support for a central drag bar 15 and two intermediate drag bars 16 to which the openers, in this case shown as single disks, are secured. Each of these drag bars is provided with a lateral branch 17 at its forward end engaging the rod 14 to brace the bar against lateral swinging movement but the two intermediate drag bars are free to slide laterally on bar 14 while the central bar is held against sliding movement by any suitable means. On each side of the frame there are mounted outer drag bars 18, the forward ends of which are both vertically and horizontally pivoted to the outer sides of the frame bar 10 at points forward of the rod 14 where they engage pivot bolts 19 extending laterally from the frame and supported by brackets 20 on bar 10. The bolts 19 serve as horizontal pivots for hinge plates 21 to which the drag bars 18 are pivoted on vertical axes. There is thus provided one central, two intermediate and two outer drag bars each of which carries a disk opener and seed boot all of which may be raised and lowered in unison by means of a lever 22 secured to a rock shaft 23 mounted in bearing brackets 24 which are secured to upright braces connecting the handles with the frame. The lever 22 is held in adjusted position by the usual pawl and rack mechanism and the rock shaft 23 is provided with spaced lifting arms 25 formed with forked ends in which are pivoted the pressure plates 26 through which the lifting bars 27 freely pass. These bars 27 are pivoted to the seed boots and carry compression springs 28 which bear at their upper ends on the plates 26 and the bars 27 are provided with means for varying the compression of springs 28 and the height to which the openers are lifted, which means may consist of a series of perforations at the upper ends of bars 27 in any of which a cotter pin may be secured. For the purpose of varying the space between the respective openers there is employed a longitudinally extending operating rod 29 which is journaled in the front and rear cross bars 11 and 12 and has an upwardly turned handle 30 at its rear end engaging a rack 31 carried by rear frame bar 11. At its forward end, this rod 29 has secured to it a cross head 32, each of the oppositely extending arms of which is connected by spring pressed sliding links 33 to the intermediate drag bars on each side and these in turn are connected by similar links 34 to the outer drag bars at a predetermined point in the length thereof. With this device, the spacing of the drag bars may be quickly and easily adjusted by turning handle 30 to either the right or left, thereby transmitting differential movement to the intermediate and outer drag bars and preserving uniform distances between all the bars at each adjustment. The above described mechanism forms the subject matter of assignee's copending application of Hiram H. Huntington, Serial No. 563,985 filed May 26, 1922. The machine is supported on two rear caster wheels 35 which are swiveled in vertical bearings in the brackets 35' secured to the frame in the angles formed by the bent ends 10ᵃ of the frame, and on one front wheel 36 which is journaled on an axle mounted in the fork of a front truck 37 positioned within the forward arch of the frame and which has a vertical spindle 38 journaled in the supporting casting or head block 39. The head block is secured to the center of bar 12 which is preferably arched upwardly as seen in Fig. 1 and the head block is braced and secured to the sides of the frame by side members 40. The usual handles 41 are secured to the rear of the frame for use in guiding the machine and rigid draft members 42 converge forwardly from the sides of the truck 37 and carry a clevis or hitch 43 on their front ends.

The mechanism for driving the seed and fertilizer discharging devices and that for controlling the swiveling of the front wheel comprises a vertical shaft 44 (Fig. 3) journaled in a bearing 45 on the truck and having a pinion 46 fixed to its lower end which is in mesh with a pinion 47 fixed to the hub of wheel 36. At its upper end, shaft 44 is journaled in a gear cap 48 which is fastened by set screw 49 to the upper end of spindle 38 which extends some distance above head block 39 as shown in Figs. 4 and 5. The gear cap 48 encloses a larger gear 50 journaled on the upper end of spindle 38 and also a long spur gear 51 fixed on the upper end of shaft 44 and meshing with gear 50. Gear 50 has fixed beneath it a smaller bevel pinion 52. The two gears 50 and 52 are journaled on spindle 38 and can slide upwardly thereon but are normally pressed downwardly toward the top of head block 39 by a spring 53. When in lowered or normal position, the bevel pinion 52 meshes with another bevel pinion 54 which is journaled on a laterally extending stub shaft 55 mounted on head block 39 and this pinion drives with it a sprocket 56 which carries a chain 57 trained over drive sprocket (not shown) on the shaft which drives the grain discharging mechanism and also over sprocket 58 on the countershaft which drives the fertilizer discharging mechanism, both grain and fertilizer discharging mechanisms being contained in the double hopper 59 on the rear of the machine. Between the top of the head block 39 and the gears 50 and 52 there is interposed a slide member 60. This slide is provided with a slot 61 (Fig. 8) receiving spindle 38 and, at the rear end of this slot, the top of slide 60 has a depression or seat 62 connected by inclines 63 with the upper surface of the slide, the slot at this point being somewhat narrowed as at 64. On the under side, slide 60 has front and rear inclines or cams 65, 66, and these cooperate with opposite inclines or cam surfaces 67, 68 on head block 39 (Fig. 7), the incline 66 being preferably provided with depending flanges which retain it on incline 68. The narrowed portion 64 of slot 61 receives the upper end of a latch rod 69 (Figs. 4, 5) which is held on the slide by a washer 70 secured on the rod and seated in depression 62 on slide 60. The latch rod 69 works or reciprocates in a socket 71 in head block 39 and is pressed downwardly by a spring 72. The lower end of the latch 69 normally protrudes from the under side of head block 39 and is adapted to engage a latch opening 73 provided in a rearwardly extending flange 74 on truck 37. When the latch is so engaged, the truck 37 is locked to the frame with the front wheel in position for travel straight ahead. The slide 60 is actuated by connecting link 75 which has one end engaged in an opening 76 in the rear of the slide and its other end pivoted to an upright arm 77 fixed to the rock shaft 23. With this construction, rocking of the shaft 23 to lift the openers will pull slide 60 backwards and lowering of the openers will push it forward. Owing to the cooperating cams 65, 66, 67 and 68, slide 60 will be caused to rise when pulled backwards throwing pinions 52, 54, out of mesh and lifting latch rod 69 thereby releasing the front truck and leaving it free to swivel on the head block as the direction of draft is changed to turn the machine, additional lift being given rod 69 by the incline 63 over which the washer 70 travels. Conversely, when the openers are lowered, slide 60 permits pinion 52 to be pressed downwardly by spring 53 into mesh with pinion 54 and at the same time latch 69 is pressed downwardly against the ledge or flange 74 and engages opening 73 when the truck swings back and the front wheel is in straight ahead position. With the construction above described, it will be evident that a walking drill is provided which may be turned in very small space as raising of the openers automatically releases the front truck and the machine can then be turned short on all three swivel wheels. At the same time, the advantages of a rigid front truck for straight ahead work are preserved as also the advantages arising from a front wheel drive.

The above disclosure exemplifies one form which the invention may take and modifications thereof may be made within the scope of the following claims.

What I claim as new and desire to secure by Letters Patent is:

1. A walking planter comprising a frame, a front wheel and rear wheels journaled on supports swiveled to the frame, a rigid draft member secured to the support for the front wheel, means normally locking the front wheel support to the frame in position for travel straight forward, seed discharge mechanism on the frame, means for driving said mechanism from the front wheel, furrow openers pivotally connected to the frame, means for raising and lowering the furrow openers, and means cooperating with said raising and lowering means for simultaneously releasing the front wheel and disconnecting the drive for the seed discharging mechanism as the furrow openers are raised.

2. In an implement of the class described, a frame, a wheeled truck supporting the front of the frame and connected thereto to turn on a vertical axis, supporting means for the rear of the frame, latch mechanism normally acting to lock the truck to the frame for travel straight ahead, drag bars pivotally connected to the frame and carrying ground working tools, means for raising and lowering the drag bars, and means cooperating with said raising and lowering means for withdrawing the latch to release the truck for turning when the drag bars are raised, said means comprising a slotted plate slidably mounted on the truck and having a cam portion cooperating with a cam face on the truck, and a locking pin supported in the slot in said plate and adapted to be actuated by movement thereof.

3. A walking planter comprising a frame, front and rear wheels journaled on supports swiveled to the frame, a draft member fixed to the front wheel support, means including a spring pressed pin for normally locking the front wheel support in position for travel straight forward, seed discharging mechanism on the frame, gearing for driving said mechanism from the front wheel including a shiftable pinion on the front wheel support, furrow openers on the frame having raising and lowering means, and means actuated by the raising and lowering means for releasing the front wheel and disconnecting the drive as the furrow openers are raised comprising a slidable cam plate in engagement with the shiftable pinion and formed with a slot supporting one end of the lock pin.

4. In a walking grain drill for planting grain between rows of standing corn, a frame, a wheeled truck supporting a part of the frame and connected thereto by means including a vertical spindle, supporting means for the other parts of the frame, means for locking the truck against rotation with respect to the frame for insuring travel of the drill in a desired direction, tool bars pivotally connected to the frame, earth working elements carried by the tool bars, means for elevating and depressing the tool bars, and devices cooperating with the elevating and depressing means to control the truck locking means, said devices including a slotted cam plate cooperating with a cam face upon the truck and a locking pin projecting through the slot in said plate.

5. In an agricultural implement, a frame, supports for the rear part of said frame, a front caster wheel support for said frame, a ground wheel rotatable on said support, a draft member at the front part of the frame, locking means cooperating with the caster wheel, supports for holding the ground wheel in position for straight-ahead travel of the implement, power transmitting devices operatively connected to said ground wheel and supported on said frame, earth-working elements pivotally connected to said frame, and controlling means for simultaneously raising said earth-working elements, releasing the locking means and unclutching said power transmitting devices.

6. In a grain drill for planting grain between rows of standing corn, a frame, a front caster wheel, rear supports for the frame, means normally locking the front wheel in position for straight-ahead travel of the drill, seed dispensing mechanism on the frame, power transmitting devices operatively connected to the front wheel for driving the seed discharging mechanism, furrow openers, and means for simultaneously raising the furrow openers and releasing the locking means for the front wheel and disconnecting the power transmitting devices.

7. In a grain drill for planting grain between rows of standing corn, a frame, a front wheel, rear supports for the frame, means normally locking the front wheel in position for straight-ahead travel of the drill, seed dispensing mechanism on the frame, power transmitting devices operatively connected to the front wheel for driving the seed dispensing mechanism, furrow openers, and means for simultaneously raising the furrow openers and releasing the locking means for the front wheel and disconnecting the power transmitting devices, said means including a shaft rockable to simultaneously release the front wheel locking means and raise the furrow openers and disconnect the power transmitting devices.

8. In a grain drill for planting grain between rows of standing corn, a frame, a front wheel, rear supports for the frame, means normally locking the front wheel in position for straight-ahead travel of the drill, seed dispensing mechanism on the frame, power transmitting devices operatively connected to the front wheel for driving the seed dispensing mechanism, furrow openers, and means for simultaneously raising the furrow openers and releasing the locking means for the front wheel and disconnecting the power transmitting devices, said means including a single element movable in one direction to perform the above mentioned simultaneous operations.

9. In a grain drill for planting grain between rows of standing corn, a frame, a front wheel, rear supports for the frame, means normally locking the front wheel in position for straight-ahead travel of the drill, seed dispensing mechanism on the frame, power transmitting devices operatively connected to the front wheel for driving the seed dispensing mechanism, furrow openers, and means for simultaneously raising the furrow openers and releasing the locking means for the front wheel and disconnecting the power transmitting devices, said means comprising a rock shaft movable in one direction to perform the above mentioned functions, and connections between the furrow openers, the locking means, and the the power transmitting devices, respectively, and the rock shaft.

10. In an agricultural implement, a frame, supports for the rear part of said frame, a front caster wheel support for said frame, a ground wheel rotatable on said support, a draft member at the front part of the frame, locking means cooperating with the caster wheel, locking means for holding the ground wheel in position for straight-ahead travel of the implement, power transmitting devices operatively connected to said ground wheel and supported on said frame, earth-working elements pivotally connected to said frame, and controlling means for simultaneously raising said earth-working elements, releasing the locking means and unclutching said power transmitting devices, said controlling means including a rock shaft movable in one direction to accomplish all of the above mentioned results.

11. In an agricultural implement, a frame, supports for the rear part of said frame, a front caster wheel support for said frame, a ground wheel rotatable on said support, a draft member at the front part of the frame, locking means cooperating with the caster wheel supports for holding the ground wheel in position for straight-ahead travel of the implement, power transmitting devices operatively connected to said ground wheel and supported on said frame, earth-working elements pivotally connected to said frame, and controlling means for simultaneously raising said earth-working elements, releasing the locking means and unclutching said power transmitting devices, said controlling means including a single element, the movement of which in one direction accomplishes the above mentioned three results.

12. In an agricultural implement, a frame, supports for the rear part of said frame, a front caster wheel support for said frame, a ground wheel rotatable on said support, a draft member at the front part of the frame, locking means cooperating with the caster wheel supports for holding the ground wheel in position for straight-ahead travel of the implement, power transmitting devices operatively connected to said ground wheel and supported on said frame, earth-working elements pivotally connected to said frame, and controlling means for simultaneously raising said earth-working elements, releasing the locking means and unclutching said power transmitting devices, said controlling means comprising a rock shaft and connections between the rock shaft, the earth-working elements, the locking means, and the power transmitting devices.

13. In a grain drill for planting grain between rows of standing corn, a frame, a front wheel, rear supports for the frame, locking means for normally holding the front wheel in position for straight-ahead travel of the drill, seed dispensing mechanism on the frame, power transmitting devices operatively connected to the front wheel for driving the seed dispensing mechanism, said power transmitting devices including an element movable to interrupt the driving connection, a member movable to release said locking means and interrupt the driving connection through the power transmitting devices, furrow openers, and a rock shaft movable in one direction to elevate the furrow openers and act upon said member to simultaneously release the locking means and disconnect the power transmitting devices.

14. In an agricultural implement, a frame, a caster wheel support for the front of the frame, a caster wheel rotatable on said support, a vertical spindle rotatably mounted on the frame and serving as an axis about which the caster wheel turns, driving mechanism on the frame, and power transmitting devices operably connected to said caster wheel and said driving mechanism, said power transmitting devices including a counter-shaft, a bearing on the support for said counter-shaft, a second bearing for the counter-shaft, gearing at the top of the spindle operatively connected to said driving mechanism, and a cap protecting said gearing and maintaining the second bearing in alignment with the first bearing.

15. In an agricultural implement, a frame, a support at the rear of the frame, a caster wheel supporting the front of the frame, a draft member at the front of the frame, a locking pin for maintaining the caster wheel in position for straight-ahead travel of the implement, power transmitting devices operatively connected to the caster wheel, and a single movable element for simultaneously releasing said locking means and disconnecting said power transmitting devices, said movable element directly engaging the locking pin and one of the power transmitting devices.

16. In an agricultural implement, a frame, a support at the rear of the frame, a caster wheel supporting the front of the frame, a draft member at the front of the frame, locking means for maintaining the caster wheel in position for straight-ahead travel of the implement, power transmitting devices operatively connected to the caster wheel, and a single sliding element for simultaneously releasing said locking means and disconnecting said power transmitting devices, said sliding element directly engaging the locking means.

17. In an agricultural implement, a frame, a support at the rear of the frame, a caster wheel supporting the front of the frame, a draft member at the front of the frame, locking means for maintaining the caster wheel in position for straight-ahead travel of the implement, power transmitting devices operatively connected to the caster wheel, and a single cam for simultaneously releasing said locking means and disconnecting said power transmitting devices, said cam directly engaging the locking means.

18. In an agricultural implement, a frame, a support at the rear of the frame, a caster wheel supporting the front of the frame, a draft member at the front of the frame, locking means for maintaining the caster wheel in position for straight-ahead travel of the implement, power transmitting devices operatively connected to the caster wheel, and a single sliding cam for simultaneously releasing said locking means and disconnecting said power transmitting devices, said sliding cam directly engaging the locking means.

19. In an agricultural implement, a frame, a support at the rear of the frame, a caster wheel supporting the front of the frame, a draft member at the front of the frame, locking means for maintaining the caster wheel in position for straight-ahead travel of the implement, power transmitting devices operatively connected to the caster wheel, and a single slotted cam plate for simultaneously releasing said locking means and disconnecting said power transmitting devices, said slotted cam plate directly engaging the locking means.

20. In an agricultural implement, a frame, a support at the rear of the frame, a caster wheel supporting the front of the frame, a draft member at the front of the frame, a locking pin for holding the caster wheel in position for straight-ahead travel of the implement, power transmitting devices operatively connected to the caster wheel, and a slotted cam plate movable with respect to the frame for simultaneously releasing said locking pin and rendering said power transmitting devices inoperative, said locking pin extending through the cam plate.

In testimony whereof I affix my signature.

ELMER E. TOWLE.